US011420511B2

(12) United States Patent
Pinschmidt et al.

(10) Patent No.: US 11,420,511 B2
(45) Date of Patent: Aug. 23, 2022

(54) DRIVE DEVICE FOR A VEHICLE AXLE OF A TWO-TRACK VEHICLE

(71) Applicant: AUDI AG, Ingolstadt (DE)

(72) Inventors: Udo Pinschmidt, Gaimersheim (DE);
Steffen Hummel, Bergen (DE);
Christian Wirth, Moosinning / Eichenried (DE)

(73) Assignee: AUDI AG, Ingolstadt (DE)

( * ) Notice: Subject to any disclaimer, the term of this patent is extended or adjusted under 35 U.S.C. 154(b) by 281 days.

(21) Appl. No.: 16/761,899

(22) PCT Filed: Oct. 18, 2018

(86) PCT No.: PCT/EP2018/078619
§ 371 (c)(1),
(2) Date: May 6, 2020

(87) PCT Pub. No.: WO2019/091750
PCT Pub. Date: May 16, 2019

(65) Prior Publication Data
US 2020/0317041 A1    Oct. 8, 2020

(30) Foreign Application Priority Data

Nov. 13, 2017   (DE) ..................... 10 2017 220 165.7

(51) Int. Cl.
| *F16H 48/36* | (2012.01) |
| *B60K 6/365* | (2007.10) |
| *B60K 1/00* | (2006.01) |
| *B60K 6/48* | (2007.10) |

(52) U.S. Cl.
CPC ................ *B60K 6/365* (2013.01); *B60K 1/00* (2013.01); *B60K 6/48* (2013.01); *F16H 48/36* (2013.01);

(Continued)

(58) Field of Classification Search
CPC ............ B60K 6/365; B60K 6/48; F16H 48/36
See application file for complete search history.

(56) References Cited

U.S. PATENT DOCUMENTS

| 10,962,091 B2 * | 3/2021 | Trautmann ............. B60K 6/387 |
| 10,995,840 B2 * | 5/2021 | Pinschmidt ............ B60K 6/387 |

(Continued)

FOREIGN PATENT DOCUMENTS

| DE | 10 2009 056 366 A1 | 6/2011 |
| DE | 10 2012 013 375 A1 | 1/2014 |

(Continued)

OTHER PUBLICATIONS

International Search Report and Written Opinion of the International Searching Authority dated Feb. 12, 2019 in corresponding International application No. PCT/EP2018/078619; 38 pages including Machine-generated English-language translation.

(Continued)

*Primary Examiner* — Derek D Knight
(74) *Attorney, Agent, or Firm* — Maier & Maier, PLLC

(57) ABSTRACT

The disclosure relates to a drive device for a vehicle axle, especially a rear axle, of a two-track vehicle, wherein the vehicle axle includes an axle differential, which can be connected at the input end to a primary drive machine and at the output end to flange shafts arranged on either side with vehicle wheels of the vehicle axle, wherein the vehicle axle is associated with a shiftable superimposing gear, which can be shifted to a torque distribution mode by a torque distribution shift element, in which a drive torque generated by an additional drive machine in a first load path can be coupled to one of the flange shafts in order to change a torque distribution on the two vehicle wheels, and the drive torque generated by the additional drive machine can be coupled to the input side of the axle differential in a second load path.

20 Claims, 11 Drawing Sheets

(52) U.S. Cl.
CPC .............................. *B60K 2001/001* (2013.01);
*B60K 2006/4808* (2013.01); *B60K 2006/4841*
(2013.01); *B60Y 2200/92* (2013.01); *B60Y
2300/82* (2013.01); *B60Y 2400/73* (2013.01);
*F16H 2048/364* (2013.01); *F16H 2048/368*
(2013.01); *F16H 2200/2097* (2013.01)

(56) References Cited

U.S. PATENT DOCUMENTS

| | | | | |
|---|---|---|---|---|
| 11,059,364 | B2 * | 7/2021 | Pinschmidt | B60K 17/16 |
| 11,065,955 | B2 * | 7/2021 | Pinschmidt | B60K 1/00 |
| 11,110,789 | B2 * | 9/2021 | Pinschmidt | F16H 48/11 |
| 2017/0059023 | A1 * | 3/2017 | Severinsson | B60K 17/165 |

FOREIGN PATENT DOCUMENTS

| | | |
|---|---|---|
| DE | 10 2013 202 381 A1 | 8/2014 |
| DE | 10 2013 019 906 A1 | 5/2015 |
| DE | 10 2013 019 907 A1 | 5/2015 |
| DE | 10 2014 007 940 A1 | 11/2015 |
| DE | 10 2014 210 549 A1 | 12/2015 |
| DE | 10 2014 015 793 A1 | 4/2016 |
| DE | 10 2016 104 046 A1 | 9/2016 |

OTHER PUBLICATIONS

Examination Report dated Aug. 1, 2018 in corresponding German application No. 10 2017 220 165.7; 14 pages including Machine-generated English-language translation.

Examination Report dated Dec. 10, 2018 in corresponding German application No. 10 2017 220 165.7; 8 pages including Machine-generated English-language translation.

International Preliminary Report on Patentability (Chapter I) dated May 19, 2020, in corresponding International application No. PCT/EP2018/078619; 10 pages.

* cited by examiner

DRIVE DEVICE FOR A VEHICLE AXLE OF A TWO-TRACK VEHICLE

FIELD

The disclosure relates to a drive device for a vehicle axle, especially a rear axle, of a two-track vehicle.

BACKGROUND

From DE 10 2014 015 793 A1 there is known a drive device of this kind for a vehicle rear axle comprising an axle differential, which can be connected at the input end to a primary drive machine (such as an internal combustion engine) and can be connected at the output end to flange shafts arranged on either side with vehicle wheels of the vehicle axle. The vehicle axle is associated with a shiftable superimposing gear, comprising a torque distribution shift element and a hybrid shift element. With the aid of the torque distribution shift element, a torque distribution mode of the superimposing gear can be activated, in which a drive torque generated by an additional drive machine (such as an electric machine) can be coupled to a transmission-side flange shaft in order to alter the torque distribution on the two vehicle wheels (that is, electronic torque vectoring). With the aid of the hybrid shift element, a hybrid mode is activated, wherein in a first hybrid shift position of the hybrid shift element the drive torque generated by the additional drive machine can be engaged evenly distributed on the two flange shafts of the vehicle wheels via the axle differential in a first transmission stage of the superimposing gear. By contrast, in a neutral position of the hybrid shift element, the additional drive machine is disengaged from the superimposing gear.

In the above DE 10 2014 015 793 A1, the superimposing gear comprises a total of three planetary gearings, which can be shifted by means of two brakes in order to provide the hybrid mode or the torque distribution mode, resulting in a design space-intensive arrangement on the whole.

The problem which the invention proposes to solve is to provide a drive device for a vehicle axle of a two-track vehicle having reduced design space as compared to the prior art, in which the function of the superimposing gear should be adaptable to different vehicle makes and models in a simple design.

The hybrid shift element can be shifted not only into the above defined first hybrid shift position, in which the drive machine is connected in driving manner across a first transmission stage of the superimposing gear to the axle differential, but also in addition it can be shifted into a second hybrid shift position. In the second hybrid shift position, the drive torque generated by the additional drive machine is engaged in a second transmission stage of the superimposing gear (different from the first transmission stage) via the axle differential and evenly distributed on the two flange shafts of the vehicle wheels. For example, the first transmission stage of the superimposing gear may be a $CO_2$-optimally designed first hybrid gear stage, while the second transmission stage of the superimposing gear forms a starting gear (that is, a second hybrid gear stage).

SUMMARY

In one advantageous technical design, the superimposing gear comprises a planetary gearing which can be shifted with the aid of the hybrid shift element into the two transmission stages (hereinafter, a hybrid planetary gearing), composed of a sun gear, a radially outer ring gear and planet gears meshing between them, being rotationally mounted on a planet carrier. The elements of the hybrid planetary gearing may be shifted as follows in the superimposing gear: an input element, especially a sun gear, can be connected to a transmission input shaft driven by the additional drive machine and connected by its output element, especially the planet carrier, to a transmission output shaft which is connected in driving manner to the input side of the axle differential. The reaction element, especially a ring gear, of the hybrid planetary gearing can be coupled with the aid of the hybrid shift element into the first or into the second hybrid shift position or it may be firmly braked.

Preferably, in the first hybrid shift position of the hybrid shift element the ring gear is firmly braked by a first brake against a transmission housing. In the neutral position of the hybrid shift element, on the other hand, the ring gear can turn freely. In the second hybrid shift position, the ring gear can be locked to the sun gear. In this case, the ring gear can be engaged by a shiftable clutch with the transmission input shaft, on which the sun gear is rotationally fixed.

In terms of a drive device of short design in the vehicle lengthwise direction, it is preferable when the hybrid shift element is arranged coaxially to the transmission input shaft. Furthermore, it is advantageous in terms of design space when the hybrid shift element can be shifted axially in both directions, that is, from its neutral position in the axial direction either to its first hybrid shift position or in the opposite direction to its second hybrid shift position.

In terms of a further package optimization, it is preferable when the transmission input shaft, the transmission output shaft and the transmission-side flange shaft are arranged nested coaxially to each other. In this case, it is preferable in terms of an easy shifting when the transmission input shaft is realized as an outer hollow shaft, in which the transmission output shaft is situated as an intermediate hollow shaft. Preferably, the transmission-side flange shaft can extend as a solid shaft through this intermediate hollow shaft.

Depending on the available design space, it may be preferable when the planetary gearing is arranged coaxially to the transmission-side flange shaft, while the additional drive machine (such as an electric machine) with its intensive design space requirement is arranged not coaxially, but instead axially parallel to the transmission-side flange shaft. In this case, the additional drive shaft can be connected by a reduction stage to the transmission input shaft. The reduction stage may be a double spur gear stage, which is advantageous to the design space. Alternatively, the reduction stage may be of any other design, such as a single spur gear stage combined with a planetary gearing.

In the above transmission design, it is advantageous in terms of design space when both the sun gear of the hybrid planetary gearing, a shifting element to form the second hybrid shift position, and also an output-end gear of the reduction stage are rotationally fixed on the transmission input shaft.

As mentioned above, the shiftable superimposing gear also additionally comprises the torque distribution shift element, which can activate the torque distribution mode of the superimposing gear when it is operated. In a favorable design space configuration, for this purpose the superimposing gear may comprise a torque distribution planetary gearing, preferably being identical in design to the hybrid planetary gearing. Accordingly, the torque distribution planetary gearing may be connected by its input element, especially a ring gear, to the transmission input shaft and can be rotationally fixed by its output element (especially a planet carrier) to the transmission-side flange shaft. Its reaction element, especially a sun gear, can either be braked firmly by means of the torque distribution shift element across a second brake against the transmission housing or it can turn freely in a neutral position of the torque distribution shift element. In such a design, the superimposing gear comprises exactly two brakes as well as a shiftable clutch in total (reduced number of shift components).

Between the two planetary gearings, it is advantageous in terms of a compact design of the superimposing gear in the vehicle transverse direction for these to be arranged directly adjacent to each other, that is, without a shift element or the like between them.

In terms of a drive device of short design in the vehicle lengthwise direction it is preferable when the torque distribution planetary gearing is arranged coaxially to the hybrid planetary gearing. Furthermore, the design space and the parts required can be reduced when the two planetary gearings have only one common ring gear.

In large series production, different variants of a vehicle type are often produced, meeting different demands on the drive device. Accordingly, it is advantageous in terms of production engineering for the superimposing gear to have a transmission structure for adaptation to the respective vehicle variants in which individual modules can be omitted or integrated in a simple design process. This is accomplished according to the invention as follows: the additional drive machine, the hybrid shift element, the hybrid planetary gearing, the torque distribution planetary gearing and the torque distribution shift element are arranged in this sequence as modules in succession in the vehicle transverse direction toward the outside of the vehicle. By omitting one or more of these modules, the superimposing gear can be adapted to different vehicle variants.

BRIEF DESCRIPTION OF THE DRAWINGS

Exemplary embodiments of the invention are described below with the aid of the enclosed figures.

There are shown.

DETAILED DESCRIPTION

Figure 1:
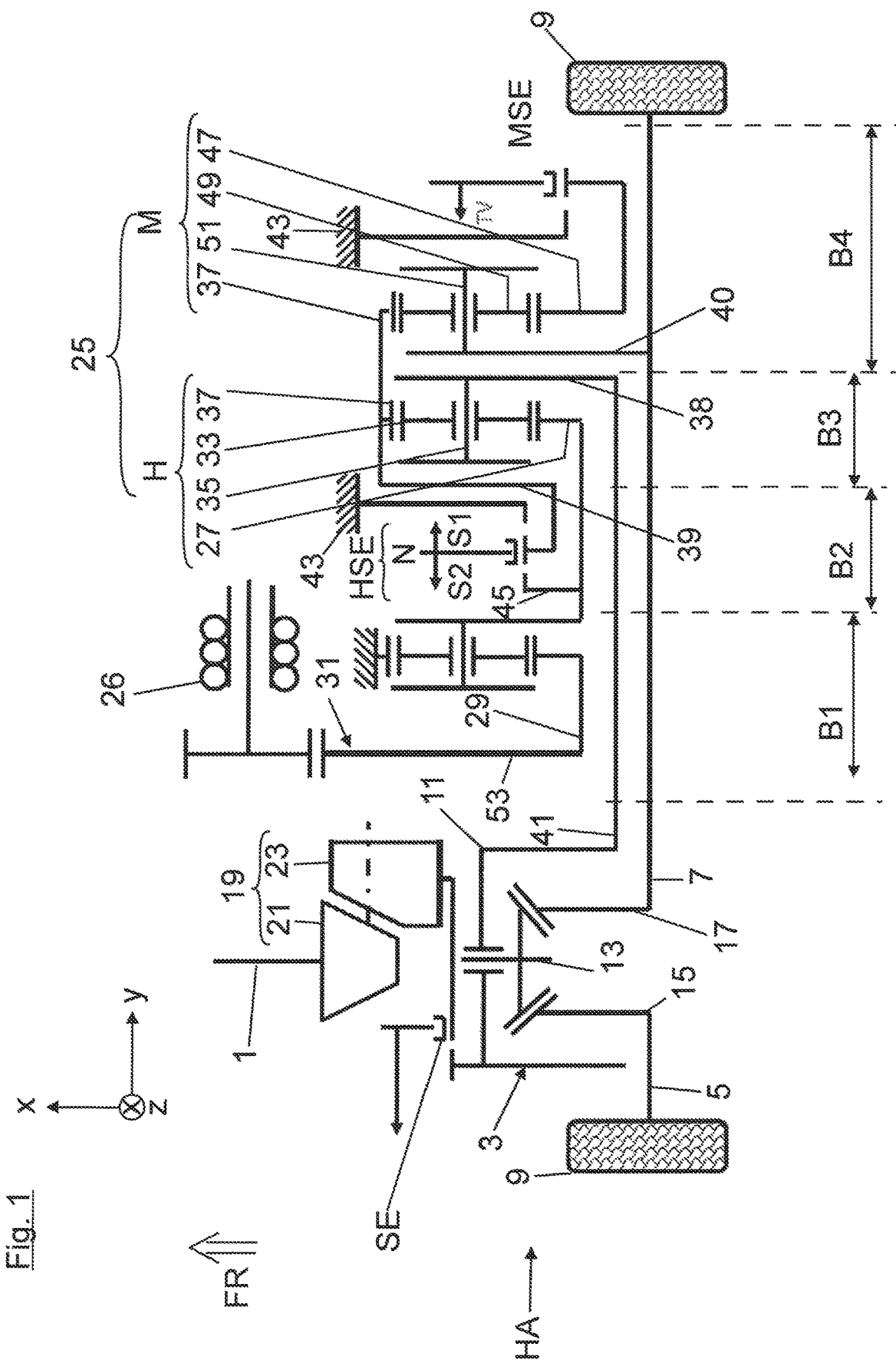
FIG. 1, in a schematic representation, a drive device for a vehicle rear axle of a two-track vehicle in a basic configuration.

FIG. 1 shows, roughly schematically, a gearing structure of a drive device for a vehicle rear axle HA of a two-track vehicle. The drive device shown in FIG. 1 may be part of an all-wheel drive, in which a front-end internal combustion engine (not shown) as the primary drive machine drives the front wheels of the vehicle across a transmission as well as a central differential and a front axle differential. The central differential can be connected across a Cardan shaft 1 to the input end of a rear axle differential 3. The rear axle differential 3 is coupled at the output side in driving manner to flange shafts 5, 7 arranged on either side with the vehicle rear wheels 9 of the vehicle rear axle HA. In FIG. 1, the rear axle differential 3 is a bevel gear differential, having a drive-side differential housing 11, on which two mutually coaxial and oppositely spaced differential bevel gears 13 (of which only one differential bevel gear 13 is shown in FIG. 1) are rotatably mounted, as well as first and second driving bevel gears 15, 17, which are arranged at right angles to the differential bevel gears 13 and coaxially spaced apart from each other, being respectively engaged with the two differential bevel gears 13. The first driving bevel gear 15 is rotationally fixed to the left flange shaft 5 in FIG. 1, while the second driving bevel gear 17 is rotationally fixed to the right flange shaft 7 in FIG. 1.

In FIG. 1, the Cardan shaft 1 can be coupled in driving manner across a bevel gearing 19 to the differential housing 11, comprising a bevel gear 21 mounted on the Cardan shaft 1, which meshes with a crown gear 23. Between the bevel gearing 19 and the differential housing 11 is interposed a shift element SE, with which the rear axle HA can be disengaged in driving from the Cardan shaft 1.

As is further seen in FIG. 1, the rear axle HA comprises a superimposing gear 25 and an electric machine 26. The superimposing gear 25 can be operated in a hybrid mode or in a torque distribution mode (that is, electronic torque vectoring), as will be explained later on. In the hybrid mode, a drive torque generated by the electric machine 26 is engaged across the superimposing gear 25 and across the rear axle differential 3 and is evenly distributed on the two flange shafts 5, 7. The hybrid mode can be implemented as a pure electric motor or in a combination of the electric machine 26 with the internal combustion engine (for example, for a boost function).

In the torque distribution mode, the drive torque generated by the electric machine 26 is taken not only across a hybrid drive flange 38, explained later on, to the input side of the axle differential 3, but also furthermore it is coupled directly across the superimposing gear 25, that is, across a torque distribution drive flange 40, to the transmission-side flange shaft 7, in order to change a torque distribution on the two rear wheels 9. The magnitude and the direction of rotation of the drive torque generated by the electric machine 26 are determined in dependence on current driving operation parameters.

The transmission structure of the superimposing gear 25 shall be explained below with the aid of FIG. 1: accordingly, the superimposing gear 25 comprises a hybrid planetary gearing H and a torque distribution planetary gearing M. The two gearings H, M are arranged directly next to each other, looking in the vehicle transverse direction y, that is, without any interpositioning of a shift element, and are oriented coaxially to each other and coupled together in driving manner by a common ring gear 37. A sun gear 27 of the hybrid planetary gearing H is rotationally fixed to a transmission input shaft 29, which is connected in driving manner across a reduction gearing 31 to the electric machine 26. The sun gear 27 meshes with the radially outer ring gear 37 across planet gears 33, which are rotatably mounted on a planet carrier 35. The planet carrier 35 is connected across a hybrid drive flange 38 to a transmission output shaft 41, which leads to the drive side (or input side) of the rear axle differential 3, that is, it is rotationally fixed to the drive-side differential housing 11.

In FIG. 1, the transmission input shaft 29, the transmission output shaft 41 and the transmission-side flange shaft 7 are arranged coaxially to and nested with each other. The transmission input shaft 29 is realized as an outer hollow shaft, in which the transmission output shaft 41 is arranged as an intermediate hollow shaft, through which the transmission-side flange shaft 7 extends.

The ring gear 37 of the hybrid planetary gearing H in FIG. 1 can either be firmly braked across a hybrid shift element HSE in a first shift position S1 against the transmission housing 43 or it can be engaged in a second shift position S2 with a shifting element 45, which is formed on the transmission input shaft 29. The hybrid shift element HSE in FIG. 1 is arranged coaxial to the transmission input shaft 29 and it can be shifted from its neutral position N in the axial direction either to the first hybrid shift position S1 or in the opposite direction to the second hybrid shift position S2. In the neutral position N, the ring gear 37 can turn freely, so that the electric machine 26 is disengaged from the superimposing gear 25.

The torque distribution planetary gearing M comprises a sun gear 47, which is rotatably mounted coaxially on the transmission-side flange shaft 7 and can be firmly braked (as a reaction element) via a torque distribution shift element MSE against the transmission housing 43. The sun gear 47 meshes with the common ring gear 37 by planet gears 49, which are rotatably mounted on a planet carrier 51. The planet carrier 51 (acting as an output element) is rotationally fixed across the already mentioned torque distribution drive flange 40 to the transmission-side flange shaft 7.

In FIG. 1, the reduction gearing 31 is constructed as a two-stage spur gear stage, whose driving-side gear 53 is rotationally fixed to the transmission input shaft 29.

In order to activate the torque distribution mode, during driving operation (such as negotiating a curve) the sun gear 47 of the torque distribution planetary gearing M is firmly braked against the transmission housing 43 by activating the torque distribution shift element MSE, depending on the current driving operation parameters. In this way, a first load path is produced between the electric machine 26 and the transmission-side flange shaft 7, in which a drive torque generated by the electric machine 26 can be coupled across the transmission input shaft 29, the common hollow shaft 37 and the planet gears 49 and the planet carrier 51 of the torque distribution planetary gearing M via the torque distribution drive flange 40 to the transmission-side flange shaft 7. At the same time, a second load path is produced, in which the drive torque generated by the electric machine 26 can be coupled via the transmission input shaft 29, the planet gears 33, the planet carrier 35 and the hybrid drive flange 38 to the transmission output shaft 41, which is attached to the differential housing 11. The hybrid shift element HSE remains idle in its neutral position N during this process.

Alternatively, for the activating of the hybrid mode, the hybrid shift element HSE depending on the driving situation is either moved to its first hybrid shift position S1 or its second hybrid shift position S2, in which a load path is formed—respectively with different transmission stages—from the electric machine 26 across the reduction gearing 31, the transmission input shaft 29, the hybrid planetary gearing H and the hybrid drive flange 38 to the transmission output shaft 41.

The first and second transmission stages, which are engaged by means of the hybrid shift element HSE, may be designed for example as follows: the first transmission stage engaged in the first hybrid shift position S1 may be designed as a $CO_2$-optimized hybrid gear stage. On the contrary, the second transmission stage engaged in the second hybrid shift position S2 can be designed as a starting hybrid gear stage.

The following benefits are achieved with the drive device shown in FIG. 1: the drive device accomplishes a building block design with at least the following variants, namely, a first variant with precisely one hybrid gear disengaged from the electric machine as a $CO_2$-optimal design, a second variant with precisely two hybrid gear stages disengaged from the electric machine as a starting gear (first gear) and a $CO_2$-optimal design (second gear), and a third variant with precisely two hybrid gear stages combined with electrical torque vectoring disengaged from the electric machine as a starting gear (first gear), $CO_2$-optimal design (second gear) and electronic torque vectoring/electronic cross locking.

Furthermore, all the variants have an axle disengaging which preserves the full hybrid/cross dynamic functions. The aforementioned $CO_2$-optimized hybrid gear stage makes possible very high efficiency. It is moreover relevant that the same direction of turning of the electric machine occurs in the $CO_2$-optimized hybrid gear stage and in the starting hybrid gear stage, so that fast shifting is made possible. Furthermore, a function reduction is economically feasible in the aforementioned building block variants thanks to elimination of parts.

Moreover, a conventional bevel gear differential 3 can be installed in the drive device of FIG. 1. The planet gear sets H, M can be designed with the same standard transmission ratios. No planet stage is omitted when any given mode is omitted (first gear, second gear, or TV function); the corresponding shift element HSE or MSE is simply eliminated.

In a superimposing gear design with only the second hybrid gear (shown in FIG. 3, 6, 7 or 10), the superimposing gear 25 as well as the shift elements can be entirely eliminated. In the maximum outfitting stage shown in FIG. 1, a total of precisely two brakes and precisely one clutch are used. The direction of turning of the electric machine does not change between the first and second hybrid gear stages. Furthermore, the hybrid operation in the first hybrid gear stage occurs with power branching (no reactive power).

As can further be seen from FIG. 1, the electric machine 26 along with the reduction gearing 31, the hybrid shift element HSE, the hybrid planetary gearing H, the torque distribution planetary gearing M and the torque distribution shift element MSE are arranged in succession as the indicated modules B1 to B4 in a sequence from the interior of the vehicle to the outside of the vehicle in the vehicle transverse direction y. In the course of a series production, the superimposing gear 25 can be adapted each time to the vehicle variant being manufactured by omitting or adding and/or modifying one or more of these modules B1 to B4. Thus, the drive device shown in FIG. 1 represents a basic outfitting in which all of the above modules B1 to B4 have been installed.

Figure 2:
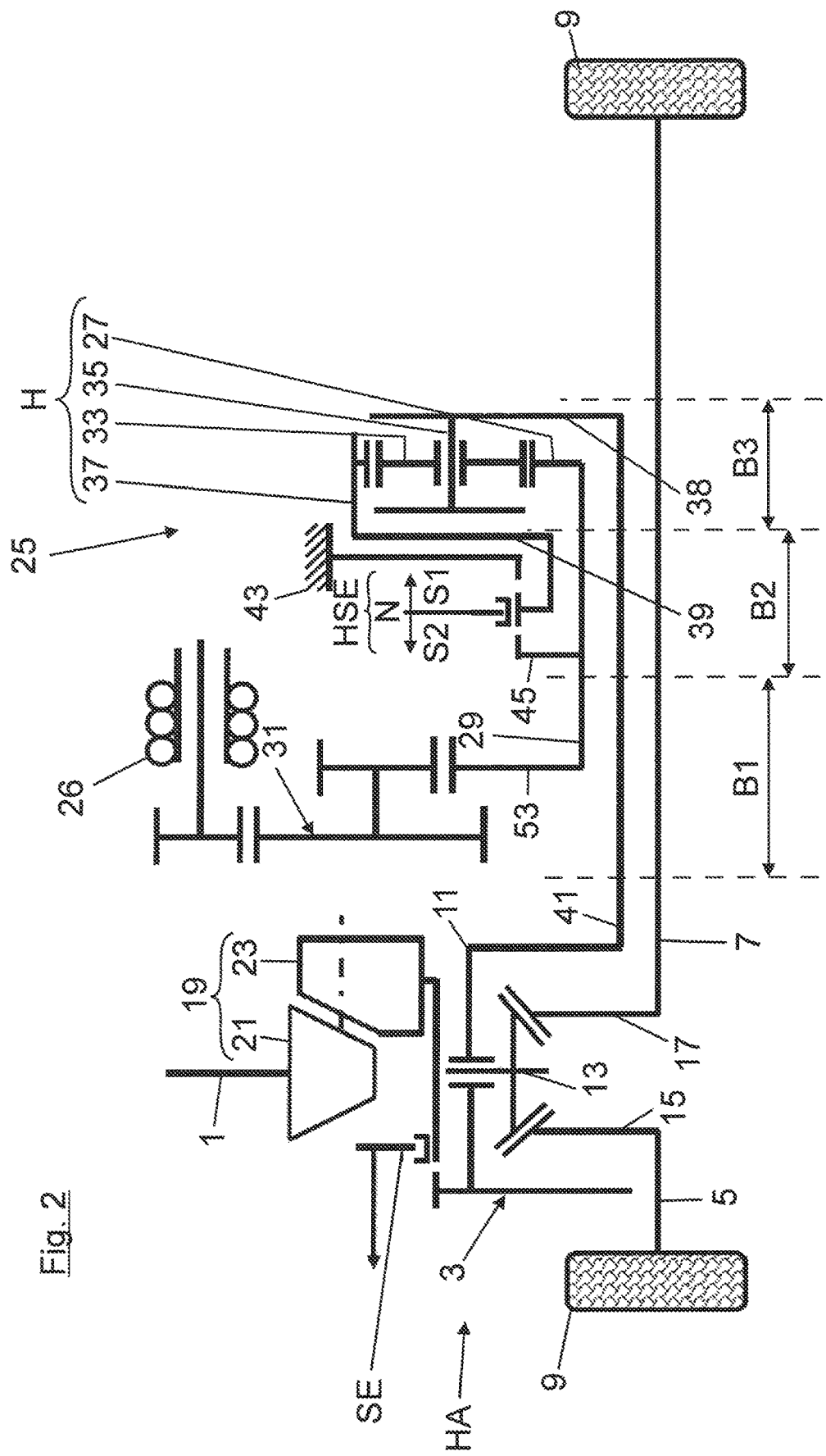
FIG. 2, in a view corresponding to FIG. 1, a first vehicle variant with reduced functional configuration as compared to FIG. 1.

On the contrary, FIG. 2 shows a first vehicle variant in which the module B4 of the torque distribution planetary gearing M and the torque distribution shift element MSE have been omitted. Accordingly, there remain in the superimposing gear 25 the modules B1 to B3. The superimposing gear 25 therefore comprises in FIG. 2 only the hybrid shift element HSE and the hybrid planetary gearing H, which can be shifted between the first and second hybrid shift position S1, S2 and the neutral position N.

Figure 3:
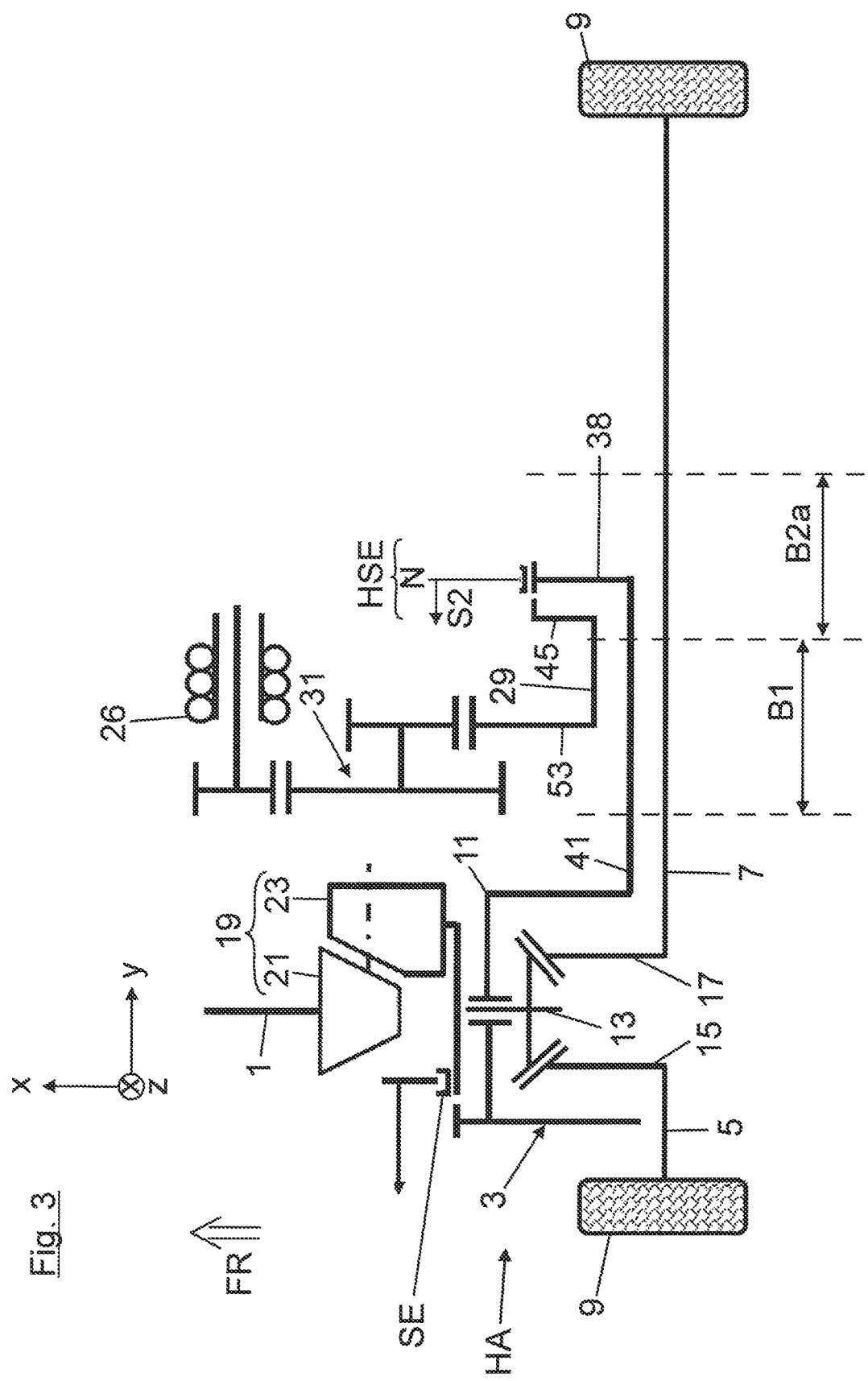
FIG. 3, a view corresponding to FIG. 2 of a second vehicle variant with further reduced functional configuration as compared to FIG. 2.

FIG. 3 shows the drive device for a second vehicle variant, in which the module B3 of the hybrid planetary gearing H is also omitted. Furthermore, instead of the module B2 a new module B2a is used, where the shift position S1 has been omitted from its hybrid shift element HSE. In FIG. 3, therefore, the hybrid shift element HSE can only be shifted between its neutral position N and the second hybrid shift position S2. Moreover, in FIG. 3 the hybrid drive flange 38 is therefore no longer coupled to the hybrid planetary gearing H, but instead the hybrid drive flange 38 can be connected by the hybrid shift element HSE directly to the transmission input shaft 29.

Figure 4:
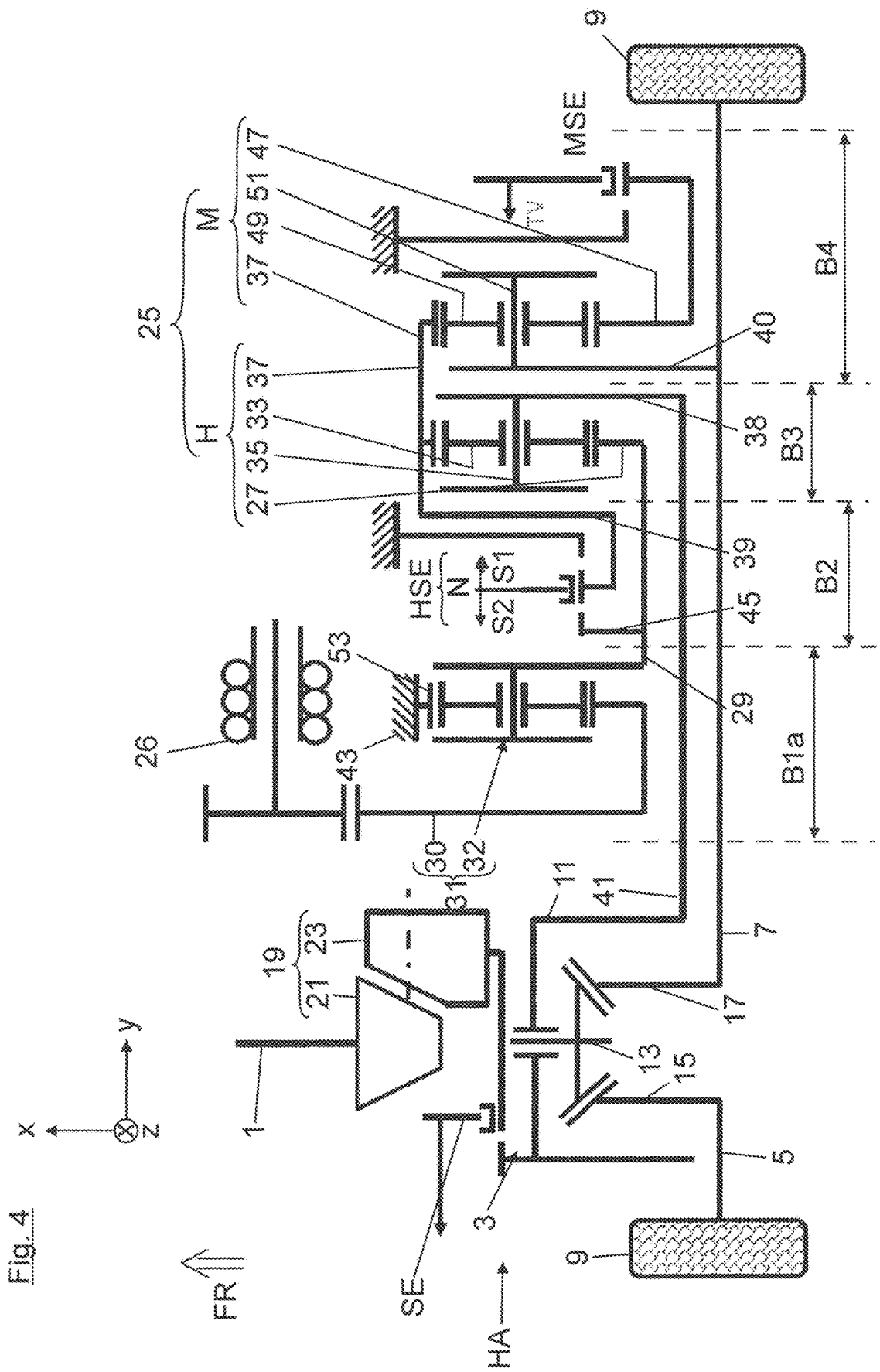
FIG. 4, a respective views corresponding to FIGS. 1 to 3 of a second exemplary embodiment, each time in the basic configuration, of the first vehicle variant and the second vehicle variant.
Figure 5:
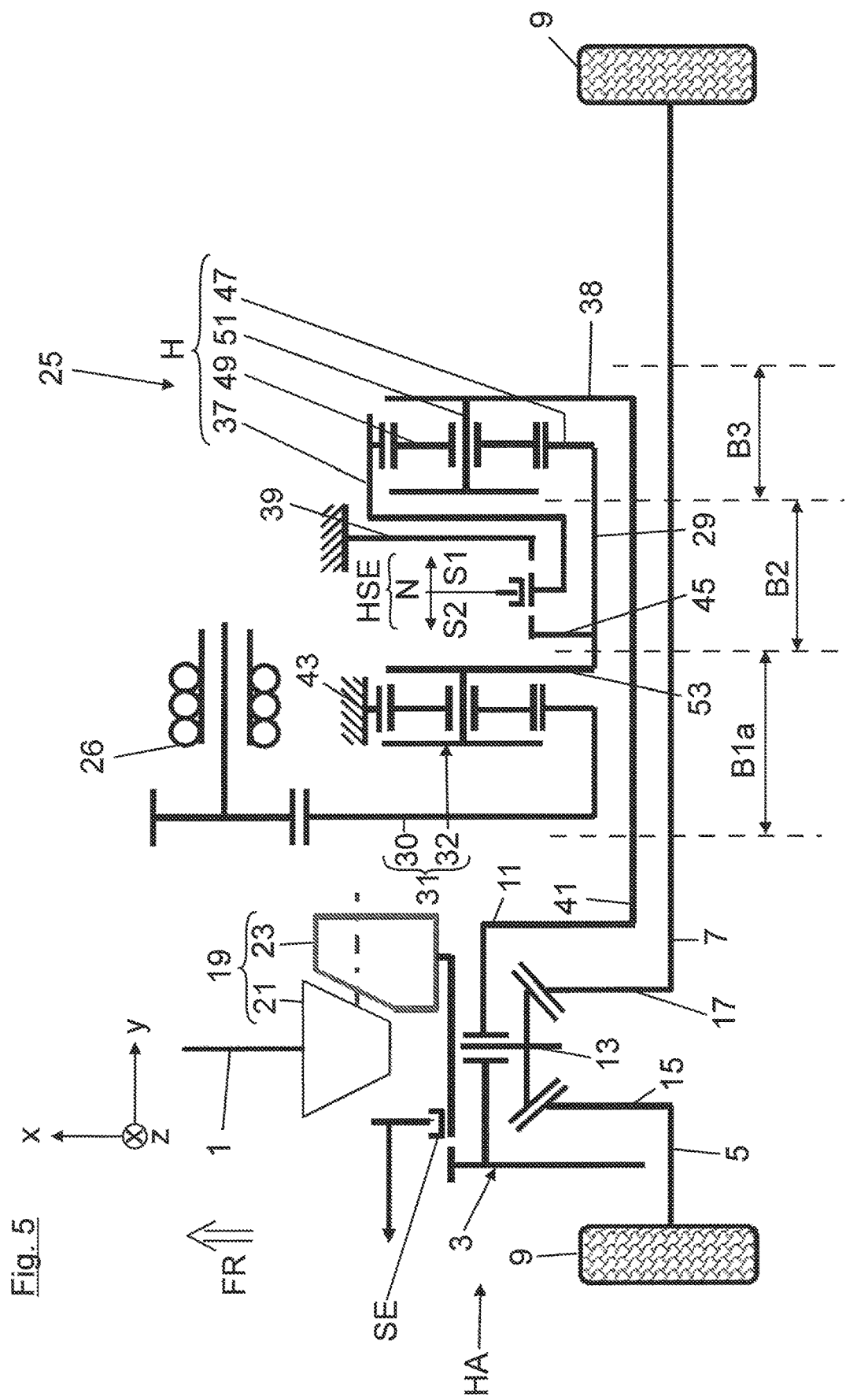
FIG. 5, a respective view corresponding to FIGS. 1 to 3 of a second exemplary embodiment, each time in the basic configuration, of the first vehicle variant and the second vehicle variant.
Figure 6:
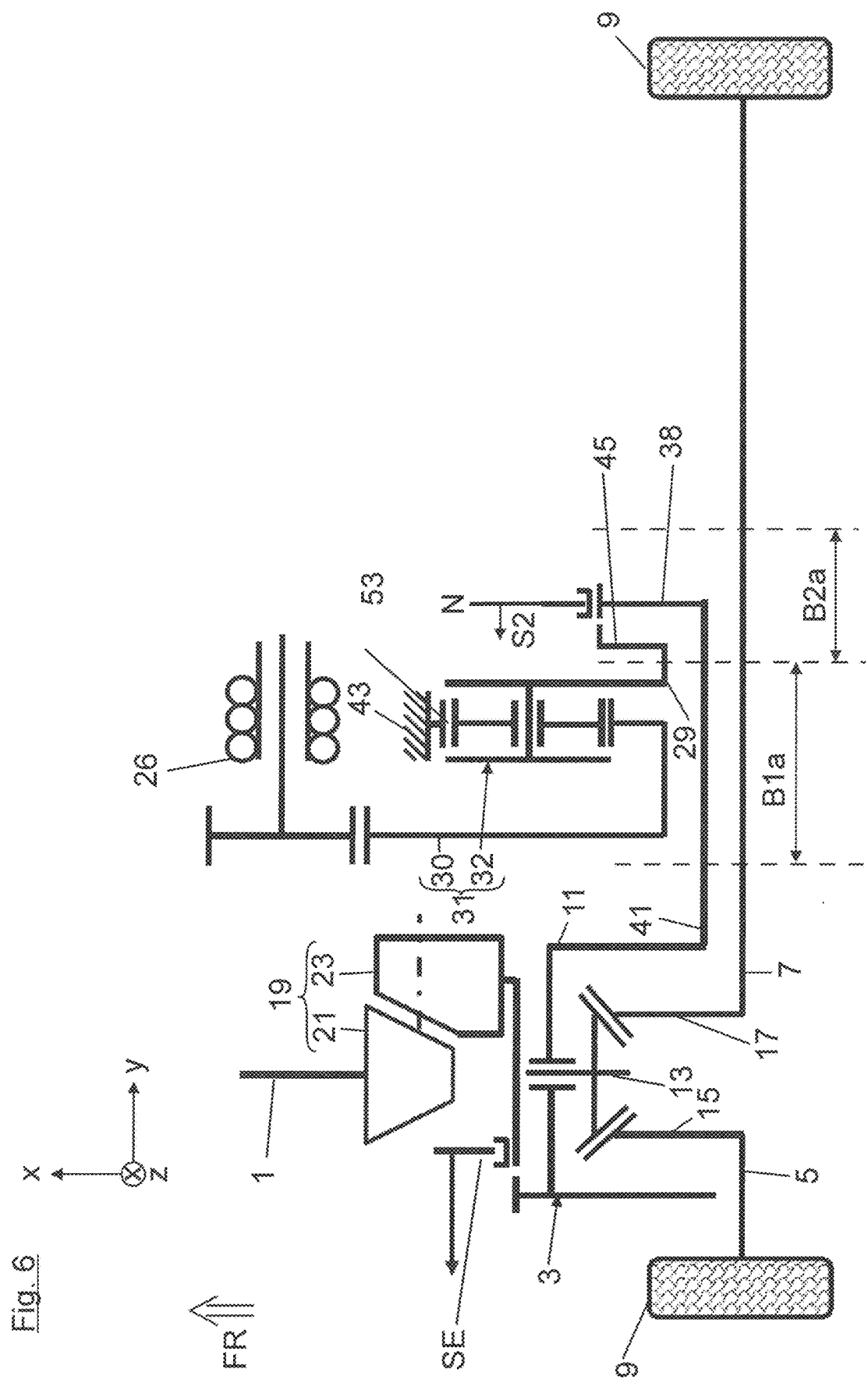
FIG. 6, a respective view corresponding to FIGS. 1 to 3 of a second exemplary embodiment, each time in the basic configuration, of the first vehicle variant and the second vehicle variant.

The exemplary embodiment shown in FIGS. 4 to 6 is largely identical to the exemplary embodiment shown in FIGS. 1 to 3 with the following exception: the module B1 shown in FIGS. 1 to 3 is replaced in FIG. 4 by a new module B 1a. In the new module B1a of FIGS. 4 to 6, the reduction gearing 31 of the electric machine 26 is no longer designed as a double spur gear stage, but rather as a single spur gear stage combined with an additional planetary gearing, whose sun gear is rotationally fixed to the transmission input shaft 29 and whose ring gear is firmly arranged on the transmission housing 43. The drive device shown in FIG. 4 forms a basic outfitting. FIGS. 5 and 6 respectively show the first and second vehicle variant similarly to FIGS. 2 and 3.

Figure 7:
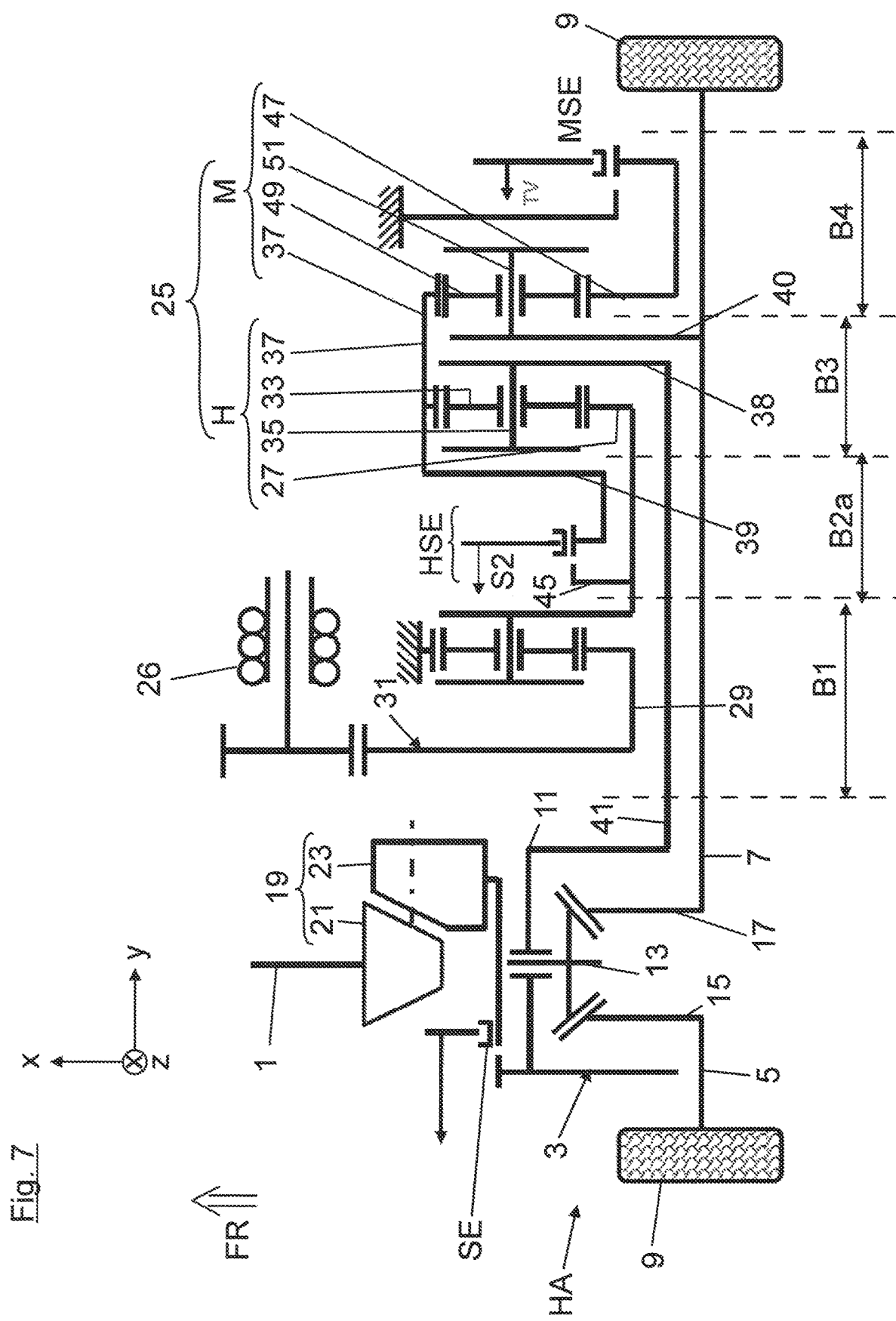
FIG. 7, a view of drive devices of further vehicle variants.

In FIGS. 7 to 11, drive devices of further vehicle variants are shown: thus, the drive device shown in FIG. 7 is largely identical to the drive device shown in FIG. 1 with the following exception: the module B2 shown in FIGS. 1 to 3 has been replaced by the new module B2a, where the shift position S1 has been eliminated from its hybrid shift element HSE, so that the common ring gear 37 can no longer be braked firmly against the transmission housing 43.

Figure 8:
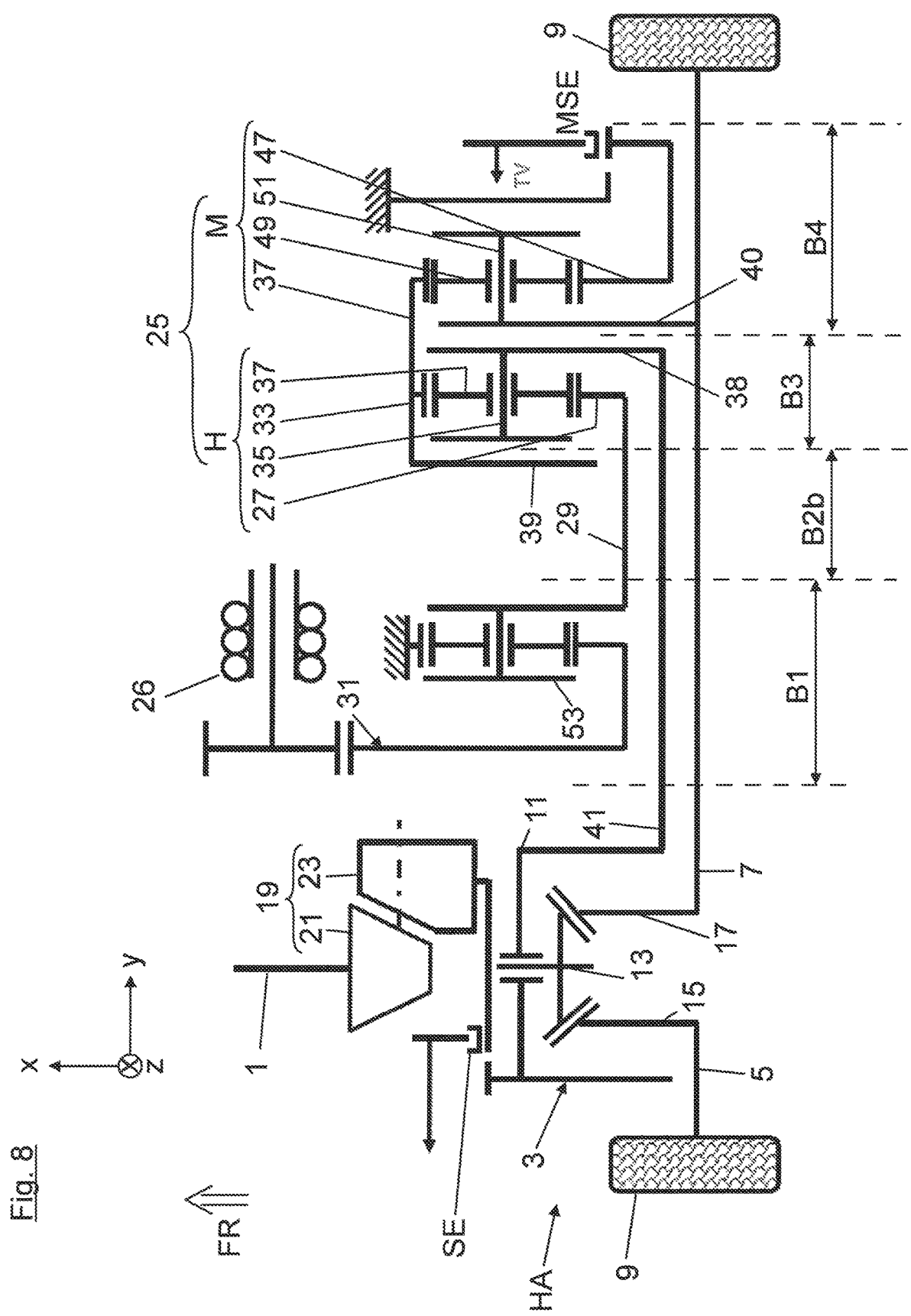
FIG. 8, a view of drive devices of further vehicle variants.

The drive device shown in FIG. 8 is likewise largely identical to the drive device shown in FIG. 1 with the following exception: the module B2 shown in FIGS. 1 to 3 has been replaced by the new module B2b, where the element HSE has been completely eliminated. The superimposing gear 25 shown in FIG. 8 therefore can no longer work in the hybrid mode, but only in the torque distribution module.

Figure 9:
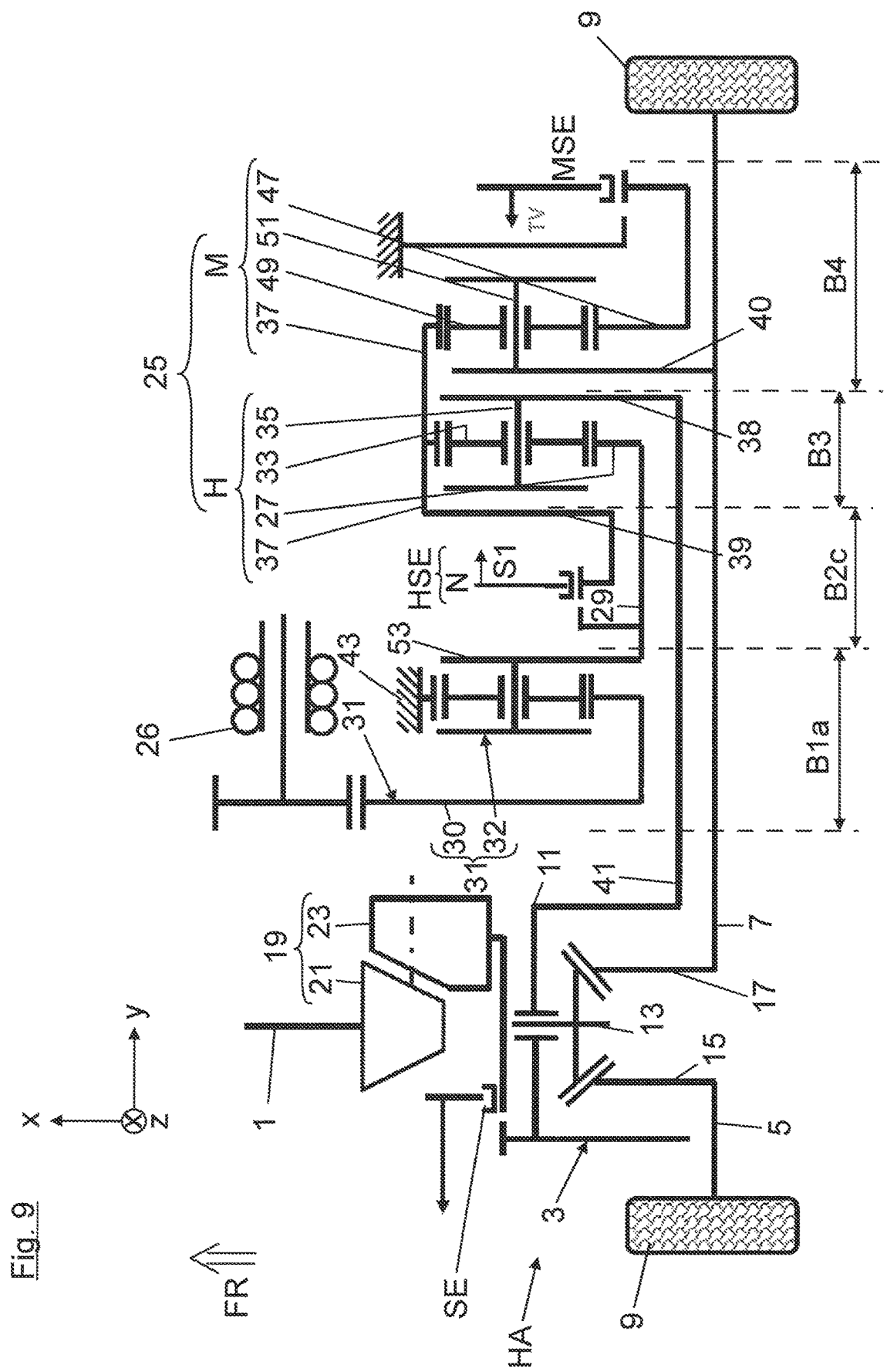
FIG. 9, a view of drive devices of further vehicle variants.

The drive device shown in FIG. 9 is largely identical to the drive device shown in FIG. 4 with the following exception: the module B2 shown in FIG. 4 has been replaced by the new module B2c, where the hybrid shift element HSE can only be shifted to the first shift position S1, while the second shift position S2 has been eliminated, so that the common ring gear 37 can no longer be locked to the sun gear 27.

Figure 10:
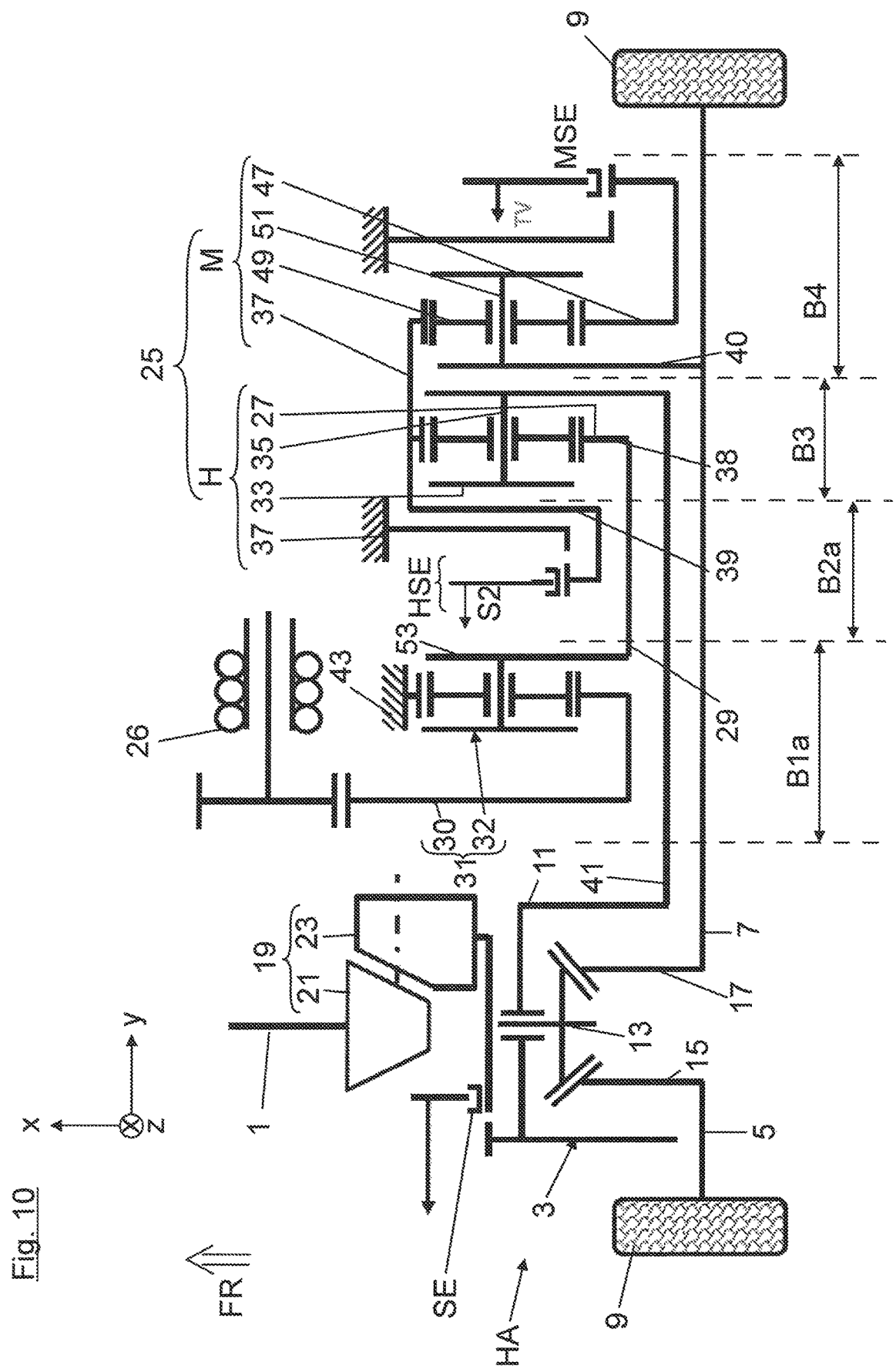
FIG. 10, a view of drive devices of further vehicle variants.

The drive device shown in FIG. 10 is likewise largely identical to the drive device shown in FIG. 4 with the following exception: the module B2 shown in FIG. 4 has been replaced by the module B2a (already shown in FIG. 3, 6 or 7), where the shift position S1 has been eliminated from its hybrid shift element HSE, so that the common ring gear 37 can no longer be braked firmly against the transmission housing 43.

Figure 11:
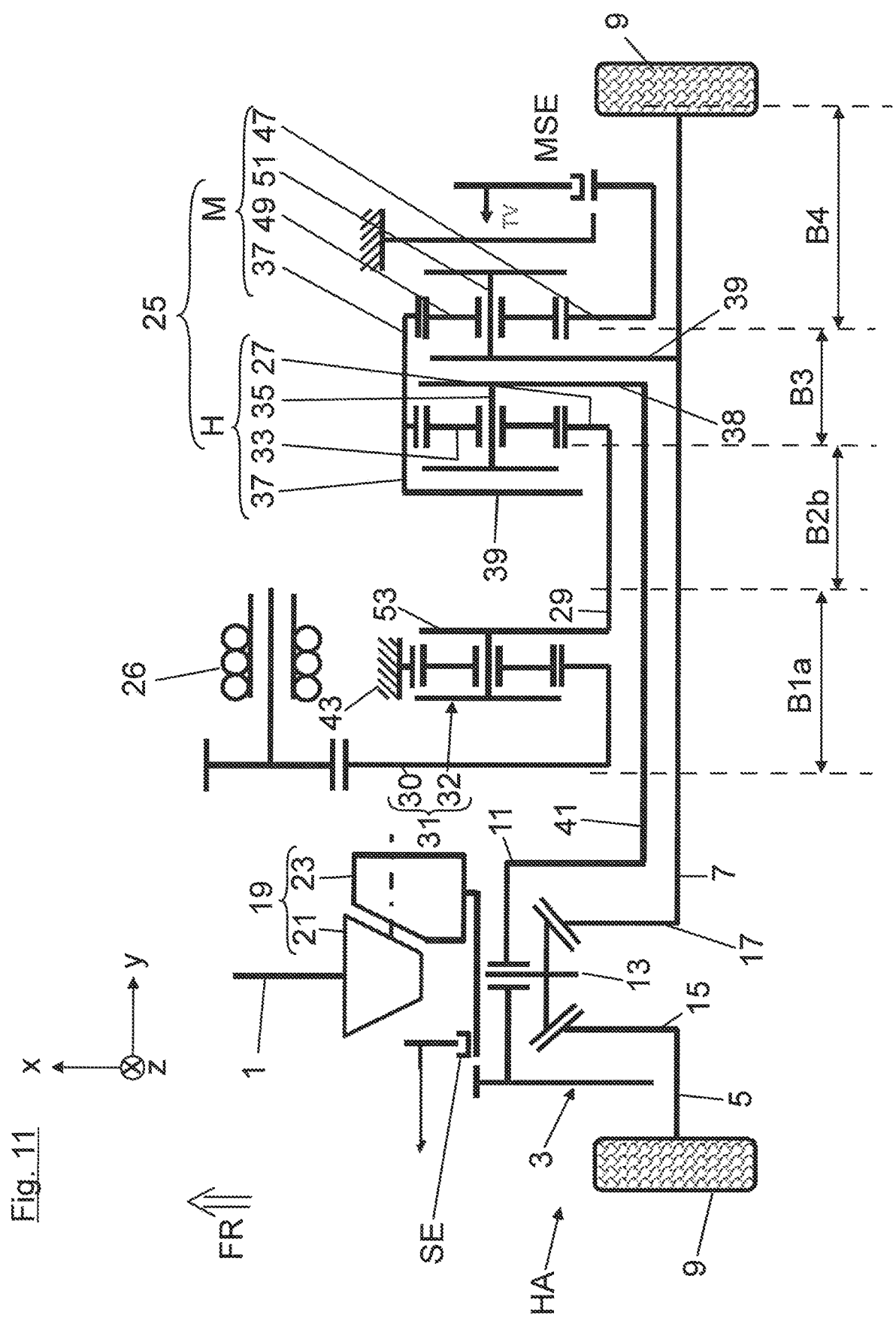
FIG. 11, a view of drive devices of further vehicle variants.

The drive device shown in FIG. 11 is likewise largely identical to the drive device shown in FIG. 4 with the following exception: the module B2 shown in FIG. 4 has been replaced by the new module B2b (already shown in FIG. 8), where the hybrid shift element HSE has been completely eliminated. The superimposing gear 25 shown in FIG. 11 therefore can no longer work in the hybrid mode, but only in the torque distribution mode.

The invention claimed is:

1. A drive device for a vehicle axle, especially a rear axle, of a two-track vehicle, wherein the vehicle axle comprises:
an axle differential, which can be connected at an input end to a primary drive machine and at an output end to flange shafts arranged on either side with vehicle wheels of the vehicle axle, wherein the vehicle axle is associated with a shiftable superimposing gear, which can be shifted to a torque distribution mode by means of a torque distribution shift element, in which a drive torque generated by an additional drive machine in a first load path can be coupled to one of the flange shafts in order to change a torque distribution on the two vehicle wheels, and the drive torque generated by the additional drive machine can be coupled to the input side of the axle differential in a second load path, and wherein the superimposing gear comprises a hybrid shift element for the activation of a hybrid mode, which, in a first hybrid shift position, engages the drive torque generated by the additional drive machine evenly distributed on the two flange shafts of the vehicle wheels via the axle differential in a first transmission stage of the superimposing gear and, in a neutral position, disengages the additional drive machine from the superimposing gear,
wherein the hybrid shift element can be shifted into a second hybrid shift position in which the drive torque generated by the additional drive machine can be engaged, evenly distributed on the two flange shafts of the vehicle wheels, via the axle differential in a second transmission stage of the superimposing gear.

2. The drive device according to claim 1, wherein the superimposing gear comprises a hybrid planetary gearing which can be shifted with the aid of the hybrid shift element into the two transmission stages, and in that the hybrid planetary gearing is connected by its input element, especially a sun gear, to a transmission input shaft driven by the additional drive machine and is connected by its output element, especially a planet carrier carrying planet gears, to a transmission output shaft leading to the axle differential, wherein the reaction element, especially a ring gear, can be coupled by means of the hybrid shift element into the first or into the second hybrid shift position or can be firmly braked.

3. The drive device according to claim 2, wherein, in the first hybrid shift position of the hybrid shift element, the ring gear can be firmly braked by a first brake against a transmission housing, in the neutral position, the ring gear can turn freely, and in the second hybrid shift position, the ring gear can be locked to the sun gear, in particular, the ring gear can be engaged by a shiftable clutch with the transmission input shaft, on which the sun gear is rotationally fixed.

4. The drive device according to claim 3, wherein the transmission input shaft, the transmission output shaft and a transmission-side flange shaft are arranged nested coaxially to each other, and the transmission input shaft is realized as an outer hollow shaft, in which the transmission output shaft is situated as an intermediate hollow shaft, through which the transmission-side flange shaft extends.

5. The drive device according to claim 4, wherein the hybrid planetary gearing is arranged coaxially to the transmission-side flange shaft and/or in that the additional drive machine is arranged axially parallel to the transmission-side flange shaft and is connected by a reduction stage to the transmission input shaft in particular by a double spur gear stage or a single spur gear stage combined with a planetary gearing.

6. The drive device according to claim 5, wherein both the sun gear of the hybrid planetary gearing, a shifting element to form the second hybrid shift position and an output-end gear of the reduction stage are rotationally fixed on the transmission input shaft.

7. The drive device according to claim 2, wherein the hybrid shift element is arranged coaxially to the transmission input shaft and the hybrid shift element can be shifted from its neutral position in the axial direction either to its first hybrid shift position or in the opposite direction to its second hybrid shift position.

8. The drive device according to claim 3, wherein the hybrid shift element is arranged coaxially to the transmission input shaft, and the hybrid shift element can be shifted from its neutral position in the axial direction either to its first hybrid shift position or in the opposite direction to its second hybrid shift position.

9. The drive device according to claim 4, the superimposing gear comprises a torque distribution planetary gearing which can be shifted with the aid of the torque distribution shift element, and in that the torque distribution planetary gearing can be connected by its input element, especially a ring gear, to the transmission input shaft, and it is rotationally fixed to the transmission-side flange shaft across its output element, especially a planet carrier carrying planet gears, wherein its reaction element, especially a sun gear, can either be braked firmly by means of the torque distribution shift element across a second brake against the transmission housing or can turn freely in a neutral position of the torque distribution shift element.

10. The drive device according to claim 9, wherein the torque distribution planetary gearing is arranged coaxially to the hybrid planetary gearing, and/or in that the two planetary gearings have a common ring gear.

11. The drive device according to claim 9, wherein the additional drive machine the hybrid shift element, the hybrid planetary gearing, the torque distribution planetary gearing and the torque distribution shift element are arranged in this sequence as modules in succession in a vehicle transverse direction toward an outside of the vehicle.

12. The drive device according to claim 11, wherein different vehicle variants can be produced by omitting, adding, and/or modifying one or more modules, and in that, in particular in a first vehicle variant, the module of the torque distribution planetary gearing and the torque distribution shift element is omitted, so that the hybrid shift element and the hybrid planetary gearing remains, which can be shifted between the first and the second hybrid shift position as well as the neutral position, and in that, in particular in a second vehicle variant, the modules of the hybrid planetary gearing the torque distribution planetary gearing and the torque distribution shift element are omitted, so that only the hybrid shift element remains, which can be shifted between its neutral position and the second hybrid shift position, in which the transmission output shaft is connected directly to the transmission input shaft across the hybrid shift element.

13. The drive device according to claim 4, wherein the transmission input shaft, the transmission output shaft and the transmission-side flange shaft are arranged nested coaxially to each other, and the transmission input shaft is realized as an outer hollow shaft, in which the transmission output shaft is situated as an intermediate hollow shaft, through which the transmission-side flange shaft extends.

14. The drive device according to claim 4, wherein the hybrid planetary gearing is arranged coaxially to the transmission-side flange shaft, and/or in that the additional drive machine is arranged axially parallel to the transmission-side flange shaft and is connected by a reduction stage to the transmission input shaft, in particular by a double spur gear stage or a single spur gear stage combined with a planetary gearing.

15. The drive device according to claim 4, wherein the hybrid planetary gearing is arranged coaxially to the transmission-side flange shaft, and/or in that the additional drive machine is arranged axially parallel to the transmission-side flange shaft and is connected by a reduction stage to the transmission input shaft, in particular by a double spur gear stage or a single spur gear stage combined with a planetary gearing.

16. The drive device according to claim 4, wherein the hybrid planetary gearing is arranged coaxially to the transmission-side flange shaft, and/or in that the additional drive machine is arranged axially parallel to the transmission-side flange shaft and is connected by a reduction stage to the transmission input shaft, in particular by a double spur gear stage or a single spur gear stage combined with a planetary gearing.

17. The drive device according to claim 4, wherein the hybrid planetary gearing is arranged coaxially to the transmission-side flange shaft, and/or in that the additional drive machine is arranged axially parallel to the transmission-side flange shaft and is connected by a reduction stage to the transmission input shaft, in particular by a double spur gear stage or a single spur gear stage combined with a planetary gearing.

18. The drive device according to claim 4, the superimposing gear comprises a torque distribution planetary gearing which can be shifted with the aid of the torque distribution shift element, and in that the torque distribution planetary gearing can be connected by its input element, especially a ring gear, to the transmission input shaft, and it is rotationally fixed to the transmission-side flange shaft across its output element, especially a planet carrier carrying planet gears, wherein its reaction element, especially a sun gear, can either be braked firmly by means of the torque distribution shift element across a second brake against the transmission housing or can turn freely in a neutral position of the torque distribution shift element.

19. The drive device according to claim 4, the superimposing gear comprises a torque distribution planetary gearing which can be shifted with the aid of the torque distribution shift element, and in that the torque distribution planetary gearing can be connected by its input element, especially a ring gear, to the transmission input shaft, and it is rotationally fixed to the transmission-side flange shaft across its output element, especially a planet carrier carrying planet gears, wherein its reaction element, especially a sun gear, can either be braked firmly by means of the torque distribution shift element across a second brake against the transmission housing or can turn freely in a neutral position of the torque distribution shift element.

20. The drive device according to claim 4, the superimposing gear comprises a torque distribution planetary gearing which can be shifted with the aid of the torque distribution shift element, and in that the torque distribution planetary gearing can be connected by its input element, especially a ring gear, to the transmission input shaft, and it is rotationally fixed to the transmission-side flange shaft across its output element, especially a planet carrier carrying planet gears, wherein its reaction element, especially a sun gear, can either be braked firmly by means of the torque distribution shift element across a second brake against the transmission housing or can turn freely in a neutral position of the torque distribution shift element.

\* \* \* \* \*